US006686723B1

United States Patent
Smith et al.

(10) Patent No.: US 6,686,723 B1
(45) Date of Patent: Feb. 3, 2004

(54) CHARGING CIRCUIT FOR DEEPLY DISCHARGED CELLS

(75) Inventors: Gregory J. Smith, Tucson, AZ (US); Yinming Chen, Tucson, AZ (US)

(73) Assignee: National Semiconductor Corporation, Santa Clara, CA (US)

(*) Notice: Subject to any disclaimer, the term of this patent is extended or adjusted under 35 U.S.C. 154(b) by 183 days.

(21) Appl. No.: 10/007,554

(22) Filed: Nov. 8, 2001

(51) Int. Cl.[7] .................................................. H02J 7/00

(52) U.S. Cl. ....................................... 320/132; 320/135

(58) Field of Search ................................. 320/106, 110, 320/128, 132, 134, 135, 136, 133, 155, 157, 158, 159

(56) References Cited

U.S. PATENT DOCUMENTS 6,291,973 B1 * 9/2001 Lee .............................. 320/128

* cited by examiner

Primary Examiner—Pia Tibbits
(74) Attorney, Agent, or Firm—Merchant & Gould PC; Timothy P. Sullivan (57) ABSTRACT

The invention is directed towards a charging circuit for charging a cell that may be deeply discharged. A primary charging circuit charges the cell when the cell is not deeply discharged. A deeply discharged charging circuit charges the cell when the cell is deeply discharged. Determining when the cell is deeply discharged includes determining when the voltage of the cell is above, below, or equal to a predetermined threshold. According to one embodiment of the invention, the predetermined threshold is 2V. When the cell voltage is below a predetermined threshold voltage, which according to one embodiment is 0.5V, a low-voltage charging path is used to charge the cell.

22 Claims, 5 Drawing Sheets

CHARGING CIRCUIT FOR DEEPLY DISCHARGED CELLS

FIELD OF THE INVENTION

The present invention is related to electronic circuits, and more particularly to a charging circuit for charging deeply discharged cells.

BACKGROUND OF THE INVENTION

Many portable electronic devices utilize a rechargeable battery to provide power. These devices include computers, cellular telephones, pagers, radios, and the like. While there are many types of rechargeable batteries used today, including nickel cadmium and nickel metal hydride, lithium ion batteries have become a popular choice. Lithium ion batteries are typically smaller and lighter than other rechargeable battery types while charge capacity is increased.

The charging of lithium ion batteries is conducted in a different manner than the charging of nickel type rechargeable batteries. Generally, nickel type rechargeable batteries are charged by applying a constant current until the cell reaches a predetermined voltage or temperature. A lithium ion cell, however, uses a different charging process. First, the lithium ion cell is supplied with a current until the cell's voltage rises above a threshold. Next, the battery charger is held at the threshold until the current of the cell decreases to a predetermined level.

These battery charging circuits typically have difficulty charging deeply discharged cells. Instead, the battery charging circuits only operate on cells that are not deeply discharged.

SUMMARY OF THE INVENTION

The invention is directed at providing a battery charging circuit for deeply discharged cells. According to one aspect of the invention, a deeply discharged charging circuit is used to charge the cell until the cell's voltage reaches a predetermined threshold.

According to another aspect of the invention, a primary charging circuit is used to charge the cell when the cell's voltage is above the predetermined threshold. The primary charging circuit regulates the charging of the cell in response to the charger and cell's current charging condition.

According to another aspect of the invention, at a very low voltage of the cell, a resistive limited current is provided to the cell through the sense resistor and a diode.

According to another aspect of the invention, a POR circuit is used to enable and disable portions of the primary charging circuit when the cell is deeply discharged and the deeply discharged charging circuit when the cell is not deeply discharged.

According to another aspect of the invention, a method is directed at charging a cell that may be deeply discharged. When the cell is deeply discharged, a deeply discharged charging circuit is used to charge the cell. When the cell is not deeply discharged, a primary charging circuit is used to charge the cell.

DETAILED DESCRIPTION OF THE PREFERRED EMBODIMENT

In the following detailed description of exemplary embodiments of the invention, reference is made to the accompanied drawings, which form apart hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "deeply discharged" means a cell that has a voltage below a predetermined voltage. According to one embodiment of the invention, the predetermined voltage is two volts. The term "battery" includes single cell batteries and multiple cell batteries. The term "cell" includes single rechargeable cells and multiple rechargeable cells. Referring to the drawings, like numbers indicate like parts throughout the views Generally, the invention is directed at providing an apparatus and method for charging a cell that may be deeply discharged. A primary charging circuit is used to charge the cell when the cell is not deeply discharged. A deeply discharged charging circuit is used to charge the cell when the cell is deeply discharged. According to one embodiment, a POR circuit produces a DISABLE signal that enables or disables the primary charging circuit. According to one embodiment, the deeply discharged charging circuit regulates the charging current to 40 mA when the cell voltage is between 0.5V and 2.0V. Another charge path exists to charge the cell at a resistive limited current below 40 mA when the cell voltage is less than 0.5V.

Figure 1:
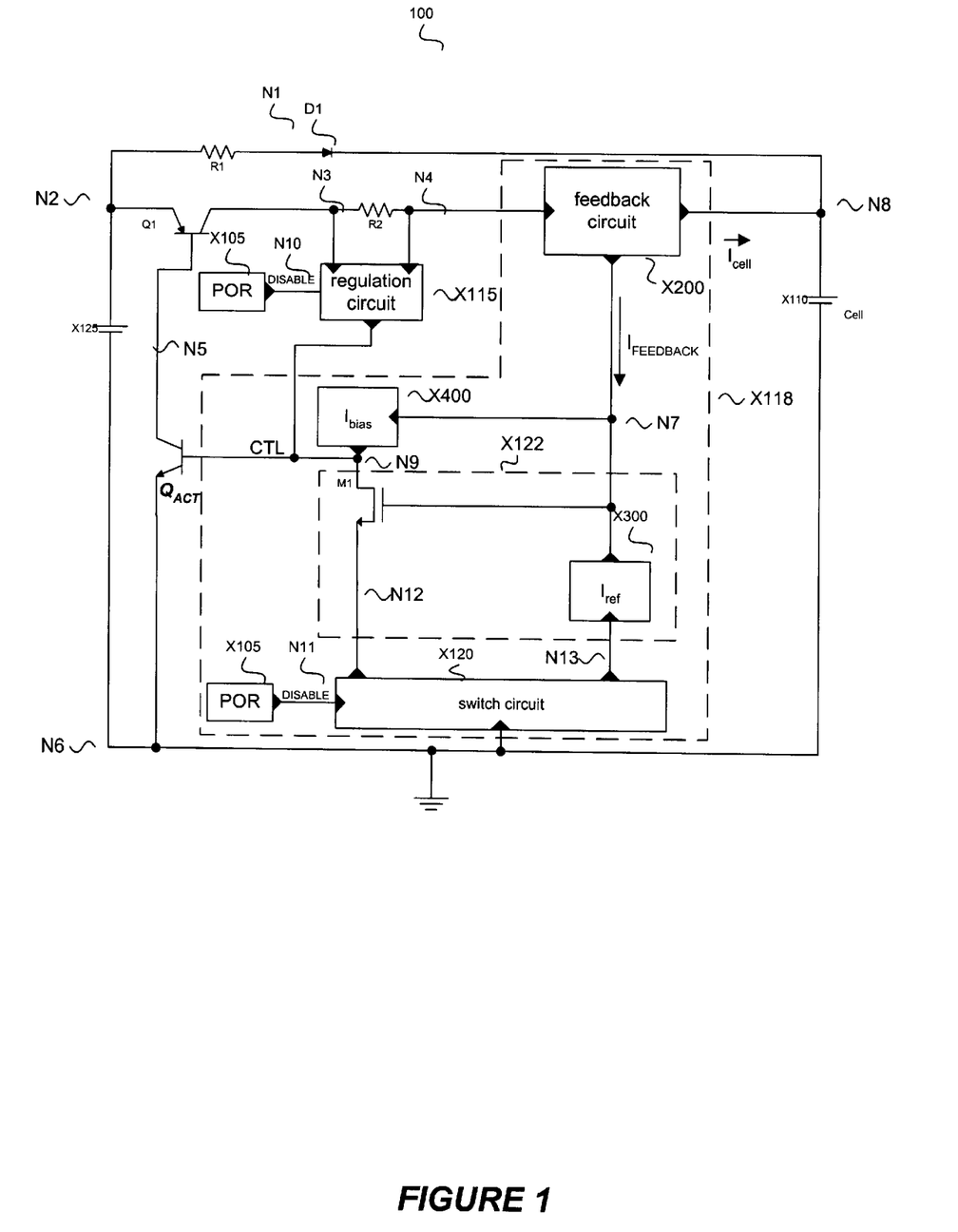
FIG. 1 shows a schematic block diagram of an exemplary charging circuit that may be used to charge deeply discharged cells.

FIG. 1 shows a schematic block diagram of an exemplary charging circuit that may be used to charge deeply discharged cells, in accordance with aspects of the invention. Charging circuit 100 includes resistor R1, resistor R2, transistor Q1, diode D1, transistor M1, transistor $Q_{ACT}$, power on reset (POR) circuit X105, cell X110, regulation circuit X115, switch circuit X120, power supply X125, feedback circuit X200, reference current circuit X300, and bias circuit X400.

The connections of charging circuit 100 will now be described. Resistor R1 is coupled between node N1 and node N2. Diode D1 is coupled between node N1 and node N8. Transistor Q1 has an emitter coupled to node N2, a collector coupled to node N3, and a base coupled to node N5. Resistor R2 is coupled between node N3 and node N4. Feedback circuit X200 has an input coupled to node N4, an outpt coupled to node N8, and another output coupled to node N7. POR circuit X105 has an output coupled to node N10 and another output coupled to node N11. Regulation circuit X115 has an input coupled to node N3, another input coupled to node N4, yet another input coupled to node N10, and an output coupled to node N9. Power supply X125 is coupled between node N2 and node N6. Node N6 is connected to ground. Transistor $Q_{ACT}$ has a collector coupled to node N5, an emitter coupled to node N6, and abase coupled to node N9. Bias circuit X400 has an input coupled to node N7 and an output coupled to node N9. Transistor M1 has a gate coupled to node N7, a drain coupled to node N9, and a source coupled to node N12. Reference current circuit X300 has an input coupled to node N13 and an output coupled to node N7. Switch circuit X120 has an input coupled to node N6, another input coupled to node N11, an output coupled to node N12, and another output coupled to node N13. Battery cell X110 is coupled between node NE and node N6. Transistor M1 and current reference circuit $I_{REF}$ X300 may be replaced by a current mirror.

Charging circuit 100 operates as follows. Charging circuit 100 includes deeply discharged charging circuit X118 that is enabled when the cell is deeply discharged. Whether the cell is deeply discharged or not is based on when the voltage of cell X110 ($V_{CELL}$) is below a predetermined threshold. According to one embodiment of the invention, the predetermined threshold is 2V. POR circuit X105 provides a DISABLE signal that deactivates the primary charging circuit when $V_{CELL}$ is below the predetermined threshold (2V). Enabling the deeply discharged charging circuit aids in circumventing the complexity and latch-up risks associated with other charging circuits that attempt to use the same charging circuitry for charging cells that are deeply discharged and cells that are not deeply discharged. Power supply X125, transistor Q1, POR circuit X105, regulation circuit X115, resistor R2, feedback circuit X200, and battery X110 are configured to act as the primary charging path to charge cell X110 when the voltage of cell X110 ($V_{CELL}$) is equal to or above the predetermined threshold (2V or greater).

When $V_{CELL}$ is less than the predetermined threshold (2V), POR circuit X105 produces a DISABLE signal that disables regulation circuit X115. The DISABLE signal is used to select either the primary charging circuit or the deeply discharged charging circuit to charge cell X110. According to one embodiment of the invention, POR X105 produces a DISABLE signal having a logical level of high ("1") when $V_{CELL}$ is less than 2V and a charger is connected. POR circuit X105 produces a DISABLE signal with a logical level of low ("0") when $V_{CELL}$ is 2V or greater. Regulation circuit X115 is disabled or enabled based on the logical level of the DISABLE signal. According to one embodiment of the invention, regulation circuit X115 is disabled when signal DISABLE has a logical level of high. When regulation circuit X115 is enabled, regulation circuit X115 produces a regulation signal at node N5 that propagates to the base of transistor Q1 in order to regulate the charging current ($I_{CELL}$) used to charge cell X110. Transistor Q1 is controlled based on the current charge level of cell X110.

As shown in the figure, a low-voltage charging path is used to charge cell X110 when $V_{CELL}$ is less than a predetermined threshold voltage ($V_{TR}$). According to one embodiment, $V_{TR}$ is approximately 0.5V. When $V_{CELL}$ is less than the predetermined threshold voltage $V_{TR}$, the low-voltage charging current path is used to charge cell X110. As shown in the figure, the low-voltage charging path exists through power supply X125, resistor R1, and diode D1 that are coupled to cell X110. According to one embodiment of the invention, when $V_{CELL}$ is below 0.5V, the low-voltage charging path charges cell X110 at a resistive limited current below 40 mA.

When $V_{CELL}$ is less than 2V, but greater than $V_{TR}$, deeply discharged charging circuit X118 is used to provide a regulated current to charge cell X110. When deeply discharged charging circuit X118 is enabled, transistor Q1 is regulated by the state of transistor circuit $Q_{ACT}$. Switch circuit X120 is enabled when signal DISABLE is high. When switch circuit X120 is enabled, a current path exists for bias circuit X400 and current reference circuit X300.

A CTL signal is used to control transistor $Q_{ACT}$. The level of signal CTL is determined by whether transistor M1 is enabled or disabled. When transistor M1 is enabled, the level of signal CTL is low. Conversely, signal CTL has a high level when transistor M1 is disabled. Bias circuit X400 is configured to produce a bias current. The bias current produced by bias circuit X400 tends to pull the gate of transistor M1 up when transistor M1 is enabled. Conversely, reference current $I_{REF}$, produced by current reference circuit X300, tends to pull the gate of transistor M1 down during this time. Reference current $I_{REF}$ is generated by current reference circuit X300 when switch circuit X120 is enabled.

Feedback circuit X200 is configured to produce signal $I_{FEEDBACK}$. According to one embodiment of the invention, signal $I_{FEEDBACK}$ has a current that is a fraction of the current $I_{CELL}$. In one embodiment, $I_{FEEDBACK}$ has a current that is approximately 1/10000 of the current of $I_{CELL}$. When the $V_{CELL}$ the signal becomes large enough, deeply discharged charging circuit X118 is disabled and the primary charging circuit is then activated and used to charge cell X110. Feedback circuit X200 is also configured to prevent reverse current flow when a load is connected and cell X110 is not being charged.

Figure 2A:
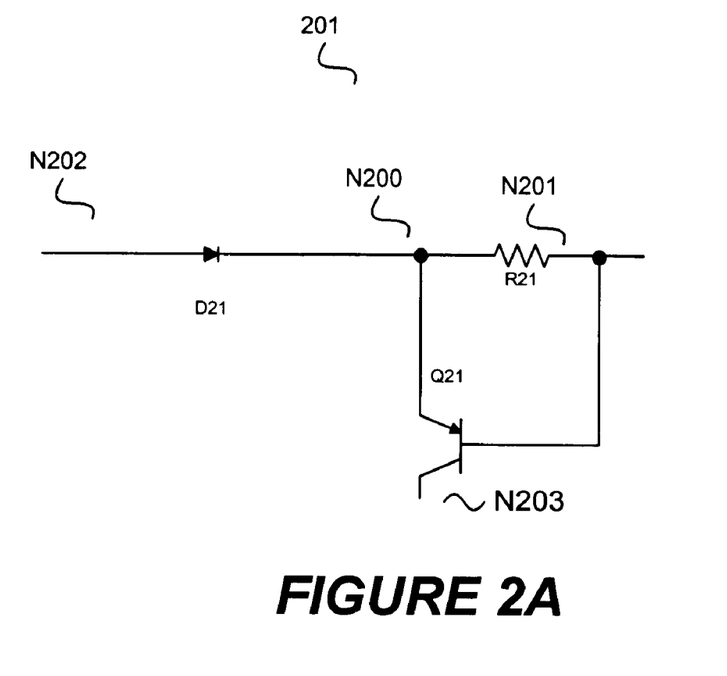
FIGS. 2A–2B illustrate schematic diagrams of exemplary feedback circuits that may be used within a charging circuit that may be used to charge deeply discharged cells.
Figure 2B:
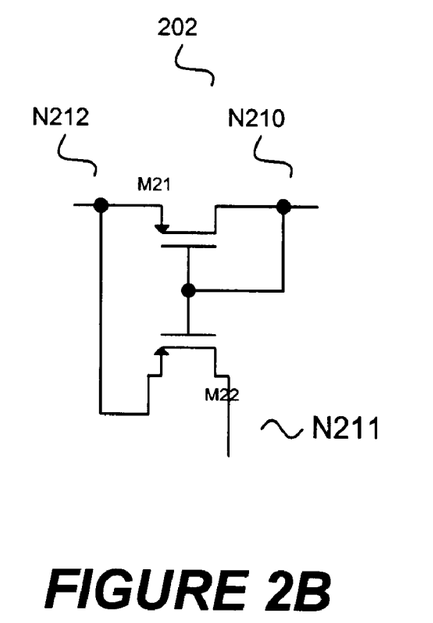

FIGS. 2A–2B illustrate schematic diagrams of exemplary feedback circuits that may be used within a charging circuit that may be used to charge deeply discharged cells, according to embodiments of the invention. As discussed above, the feedback circuits are configured to provide a feedback signal relating to the charging current. While the feedback signal ($I_{FEEDBACK}$) has a current that is a fraction of the current $I_{CELL}$, the invention is not so limited.

FIG. 2A illustrates a schematic diagram of an exemplary feedback circuit, according to one embodiment of the present invention. Feedback circuit 201 includes transistor Q21, resistor R21, and diode D21. Diode D21 is coupled between node N200 and node N202. Resistor R21 is coupled between node N200 and node N201. Transistor Q21 has an emitter coupled to node N200, a base coupled to node N201, and a collector coupled to node N203.

FIG. 2B illustrates a schematic diagram of a feedback circuit according to another embodiment of the present invention. Feedback circuit 202 includes transistor M21 and transistor M22. Transistor M21 has a source coupled to node N212, a drain coupled to node N210, and a gate coupled to node N210. Transistor M22 has a gate coupled to node N210, a source coupled to node N212, and a drain coupled to node N211.

Figures 3A, 3B:
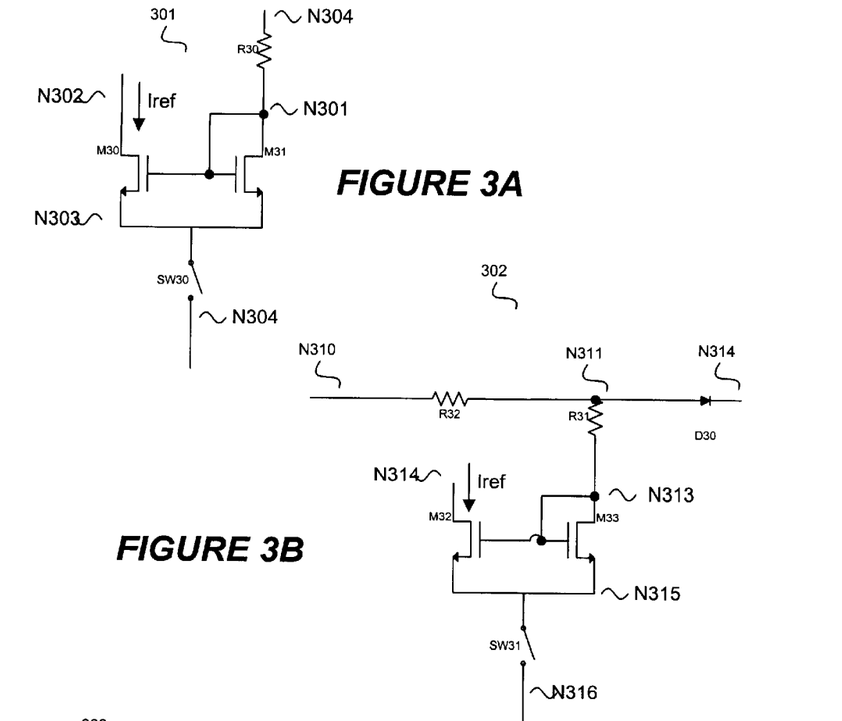
FIGS. 3A–3C show schematic diagrams of exemplary current reference circuits that may be used within a charging circuit that may be used to charge deeply discharged cells.
Figure 3C:
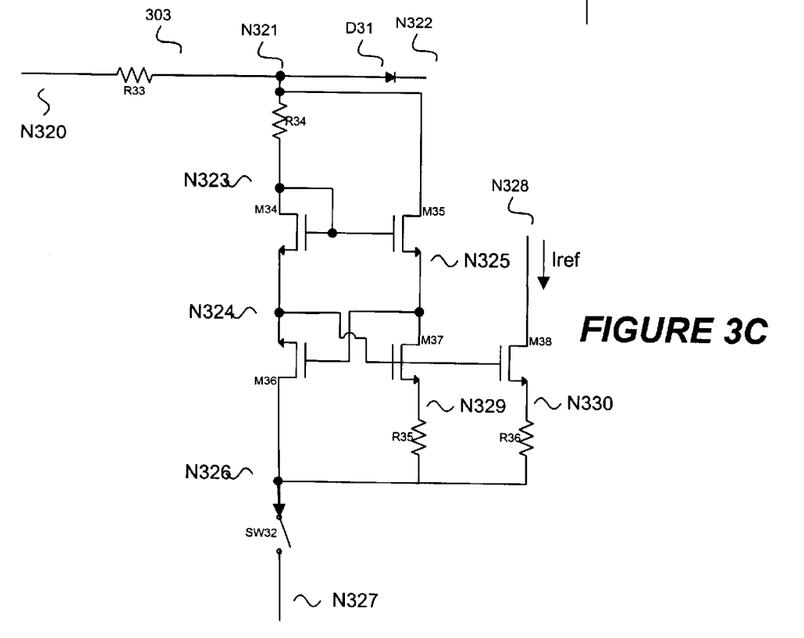

FIGS. 3A–3C show schematic diagrams of exemplary current reference circuits that may be used within a charging circuit (such as the charging circuit illustrated in FIG. 1) that may be used to charge deeply discharged cells, according to embodiments of the invention.

FIG. 3A shows a schematic diagram of a current reference circuit, according to one embodiment of the present invention. Reference current circuit 301 includes transistor M30, transistor M31, resistor R30, and switch SW30. The current reference circuits shown in FIGS. 3A, 3B, and 3C are arranged to produce a reference current used in deeply discharged charging circuit X118. Other current reference circuits may be used.

Transistor M30 has a gate coupled to node N301, a drain coupled to node N302, and a source coupled to node N303. Transistor M31 has a source coupled to node N303, a drain coupled to node N301, and a gate coupled to node N301. Resistor R30 is coupled between node N304 and node N301. Switch SW30 is coupled between node N303 and node N304.

FIG. 3B shows a schematic diagram of a reference current circuit according to another embodiment of the present invention. Current reference circuit 302 includes transistor M32, transistor M33, resistor R31, resistor R32, diode D30, and switch SW31.

Resistor R31 is coupled between node N311 and node N313. Resistor R32 is coupled between node N310 and node N311. Diode D30 is coupled between node N311 and node N314. Transistor M32 has a gate coupled to node N313, a source coupled to node N315, and a drain coupled to node N314. Transistor M33 has a gate coupled to node N313, a drain coupled to node N313, and a source coupled to node N315. Switch SW31 is coupled between node N315 and node N316.

FIG. 3C shows a schematic diagram of a current reference circuit according to another embodiment of the invention. Current reference circuit 303 includes resistor R33, resistor R34, resistor R35, resistor R36, transistor M34, transistor M35, transistor M36, transistor M37, transistor M38, diode D31, and switch SW32.

Resistor R33 is coupled between node N320 and node N321. Diode D31 is coupled between node N321 and node N322. Resistor R34 is coupled between N321 and N323. Transistor M34 has a gate coupled to node N323, a drain coupled to node N323, and a source coupled to node N324. Transistor M35 has a gate coupled to node N323, a source coupled to node N325, and a drain coupled to node N321. Transistor M36 has a gate coupled to node N325, a source coupled to node N324, and a drain coupled to node N326. Transistor M37 has a gate coupled to node N324, a source coupled to node N329, and a drain coupled to node N325. Transistor M38 has a source coupled to node N330, a drain coupled to node N328, and a gate coupled to node N324. Resistor R35 is coupled between node N329 and node N326. Resistor R36 is coupled between node N330 and node N326. Switch SW32 is coupled between node N326 and node N327.

Figure 4A:
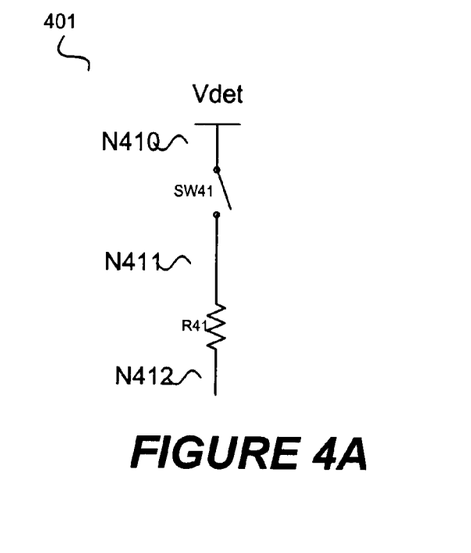
FIGS. 4A–4B illustrate schematic diagrams of exemplary bias circuits that may be used within a charging circuit that may be used to charge deeply discharged cells.
Figure 4B:
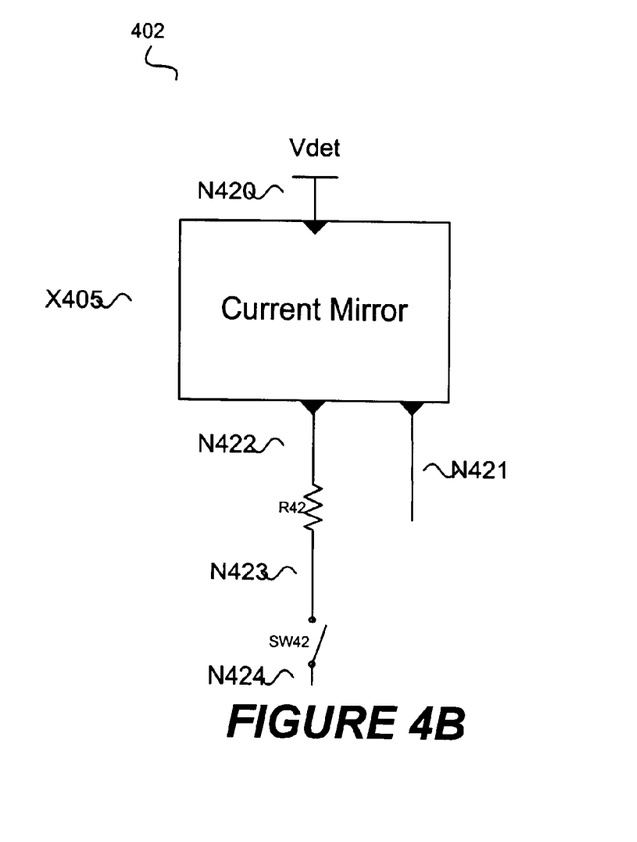

FIGS. 4A–4B illustrate schematic diagrams of exemplary bias circuits that may be used within a charging circuit (such as the charging circuit illustrated in FIG. 1) that may be used to charge deeply discharged cells, according to embodiments of the invention.

FIG. 4A illustrates a schematic diagram of an exemplary bias circuit according to one embodiment. Bias circuit 401 includes switch S41 and resistor R41. Switch SW41 is coupled between node N410 and node N411. Resistor R41 is coupled between node N411 and node N412.

FIG. 4B illustrates a schematic diagram of an exemplary bias circuit according to another embodiment. Bias circuit 402 includes current mirror X405, resistor R42, and switch SW42.

Current mirror X405 has an input coupled to node N420, an output coupled to node N422, and another output coupled to node N421. Resistor R42 is coupled between node N422 and node N423. Switch SW42 is coupled between node N423 and node N424.

Figure 5:
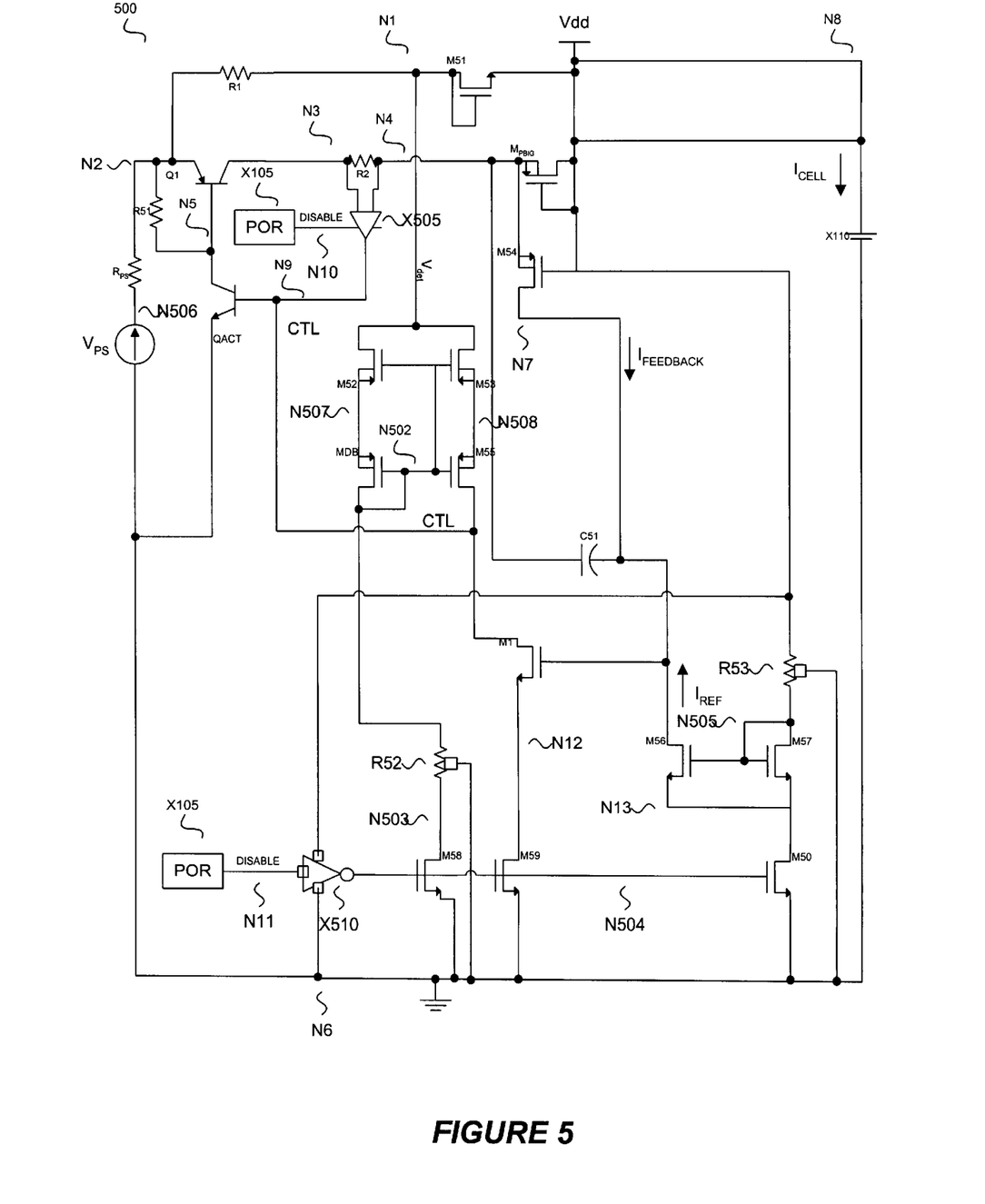
FIG. 5 shows a schematic diagram of an exemplary charging circuit that may be used to charge deeply discharged cells, according to aspects of the invention.

FIG. 5 shows a schematic diagram of an exemplary charging circuit that may be used to charge deeply discharged cells, according to one embodiment of the invention. Charger circuit 500 includes resistor R1, resistor R2, resistor RPS, resistor R51, resistor R52, resistor R53, voltage source VPS, battery cell X110, POR circuit X105, charging amplifier X505, inverter X510, capacitor C51, transistor Q1, transistor QACT, transistor MPBIG, transistor MDB, transistor M1, transistor M50, transistor M51, transistor M52, transistor M53, transistor M54, transistor M55, transistor M56, transistor M57, transistor M58, and transistor M59.

Resistor R1 is coupled between node N1 and node N2. Transistor M51 has a gate coupled to node N1, a drain coupled to node N1, and a source coupled to node N8. Battery cell X110 is coupled between node N8 and node N6. Node N6 is coupled to ground. Transistor Q1 has a base coupled to node N5, an emitter coupled to node N2, and a collector coupled to node N3. Resistor R2 is coupled between node N3 and node N4. Resistor R51 is coupled between node N2 and node N5. Resistor RPS is coupled between node N2 and node N506. Voltage source VPS is coupled between node N6 and node N506. POR circuit X105 is coupled to node N10 and to node N11. Charging amplifier X505 has an input coupled to node N3, another input coupled to node N4, yet another input coupled to node N10, and an output coupled to node N9. Transistor $Q_{ACT}$ has a base coupled to node N9, an emitter coupled to node N6, and a collector coupled to node N5. Transistor $M_{PBIG}$ has a source coupled to node N4, a body coupled to node N4, a drain coupled to node N8, and a gate coupled to node N8. Transistor M54 has a source coupled to node N4, a body coupled to node N4, a drain coupled to node N7, and a gate coupled to node N8. Transistor M52 has a drain coupled to node N1, a gate coupled to node N502, a source coupled to node N507, and a body coupled to node N507. Transistor M53 has a drain coupled to node N1, a gate coupled to node N502, a source coupled to node N508, and a body coupled to node N508. Transistor MDB has a source coupled to node N507, a body coupled to node N507, a gate coupled to node N502, and a drain coupled to node N502. Transistor M55 has a source coupled to node N508, a body coupled to node N508, a gate coupled to node N502, and a drain coupled to node N9. Capacitor C51 is coupled between node N7 and node N4. Transistor M1 has gate coupled to node N7, a source coupled to node N12, and a drain coupled to node N9. Resistor R52 is coupled between node N502 and node N503, and has a control coupled to node N6. Resistor R53 is coupled between node N8 and node N505, and has a control coupled to node N6. Inverter X510 has an input coupled to node N11, another input coupled to node N6, yet another input coupled to node N8, and an output coupled to node N504. Transistor M58 has a gate coupled to node N504, a source coupled to node N6, and a drain coupled to node N503. Transistor M59 has a gate coupled to node N504, a drain coupled to node N12, and a source coupled to node N6. Transistor M56 has a drain coupled to node N7, a gate coupled to node N505, and a source coupled to node N13.

Transistor M57 has a drain coupled to node N505, a gate coupled to node N505, and a source coupled to node N13. Transistor M50 has a gate coupled to node N504, a source coupled to node N6, and a drain coupled to node N13.

Charger circuit 500 operates as follows. Generally, one of two charging circuits integrated onto the battery charging IC is selected to charge the cell in response to the current charge of the cell. A deeply discharged charging circuit is used to charge the cell when the cell is deeply discharged. A primary charging circuit is used to charge the cell when the cell is not deeply discharged. When $V_{CELL}$ is equal to or above a predetermined threshold the primary charging circuit charges cell X110. According to one embodiment of the invention, the predetermined threshold is 2V. Voltage source VPS, resistor RPS, transistor Q1, POR circuit X105, charging amplifier X505, resistor R2, transistor MPBIG, and battery X110 act as the primary charging path within the primary charging circuit. Charging amplifier X505 is enabled when $V_{CELL}$ is 2V or greater. POR circuit X105 contains circuitry to determine when $V_{CELL}$ is above or below a predetermined value. According to one embodiment of the invention, POR circuit X105 produces a DISABLE signal with a logical level of low ("0") when charging amplifier X505 should be activated. Conversely, POR circuit X105 produces a DISABLE signal having a logical level of high when $V_{CELL}$ is less than 2V when charging amplifier X505 should be disabled. When charging amplifier X505 is enabled, charging amplifier X505 produces a feedback signal used to regulate the charging of cell X110.

A deeply discharged charging circuit is enabled when $V_{CELL}$ is less than 2V. A control signal (CTL) is used to regulate transistor $Q_{ACT}$, which, in turn, regulates pass device transistor Q1 regulating the charging current supplied to cell X110. The state of transistor M1 determines the level of the control signal (CTL). Signal CTL has a low level when transistor M1 is enabled. Conversely, signal CTL has a high level when transistor M1 is disabled. CTL signal may also be generated by a current mirror (See X122 as illustrated in FIG. 1).

Transistor M53 and transistor M55 act as a current source that produces a bias current in response to signal $V_{DET}$. Signal $V_{DET}$ is produced in response to sense resistor R1. Resistor R1 acts a sense resistor that senses the voltage across transistor Q1, thereby producing signal $V_{DET}$. Transistor M53 and transistor M55 produce a bias current that is proportional to the current of signal $V_{DET}$. The bias current tends to pull the gate of transistor M1 up when transistor M1 is enabled. However, the current through transistor M56 tends to pull the gate of transistor M1 down.

Signal $I_{REF}$ is produced in response to the output of POR circuit X105. When the deeply discharged charging circuit is enabled, signal $I_{REF}$ is produced. More specifically, POR circuit X105 produces a DISABLE signal having a logical high value during this time, thereby activating the deeply discharged charging circuit. In response to the DISABLE signal, the signal produced by inverter X510 enables transistor M58, transistor M59, and transistor M50. Transistors M58, M59, and M50 act as switches. When transistor M50 is enabled, a current path exists from cell X110 through resistor R53, transistor M57 and transistor M50 to ground producing current $I_{REF}$. Current $I_{REF}$ is mirrored to transistor M56. The current through transistor M56 tends to pull down on transistor's M1 gate.

Signal $I_{FEEDBACK}$ has a current that is a fractional proportion of the current $I_{CELL}$. Transistor M54 is configured to produce signal $I_{FEEDBACK}$. According to one embodiment of the invention, signal $I_{FEEDBACK}$ has a current that is approximately 1/10000 of current $I_{CELL}$.

Transistor M1 is enabled or disabled in response to signals $I_{FEEDBACK}$ and signal $I_{REF}$. When $I_{FEEDBACK}$ is low compared to signal $I_{REF}$ transistor M1 is fully enabled. When the charge level of cell X110 increases to a predetermined level, the current of signal $I_{FEEDBACK}$ increases to a level that disables transistor M1. When transistor M1 is disabled, charging of cell X110 moves to the primary charging circuit.

Transistor M52 and transistor MDB are used to aid in preventing latch-up of the charging circuit. Transistor MDB is configured as a floating back-body diode.

Transistor MPBIG acts as a reverse blocking circuit and is arranged to prevent reverse current flow when a load is connected to the charging circuit but the cell is not being charged.

A low-voltage charging path is selected to charge cell X110 when $V_{CELL}$ is less than a threshold voltage ($V_{TR}$). In one embodiment, $V_{TR}$ is approximately 0.5V. This low-voltage charging path is used to charge cell X110 to a sufficient level to power the components used in the deeply discharged charging circuit. The low-voltage charging path exists through voltage supply VPS, resistor RPS, resistor R1, transistor M51, and battery X110.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for charging a cell that may be deeply discharged, comprising:
   a pass circuit that includes a first pass circuit input that is coupled to a power signal, a second pass circuit input that is coupled to a first node, and a first pass circuit output that is arranged to provide a charging signal in response an input received at the second input;
   a primary charging circuit that includes a first primary charging circuit input that is coupled to the first pass circuit output, a first primary charging output that is coupled to the first node, a second primary charging circuit output that is coupled to the cell, wherein the primary charging circuit is configured to regulate the pass circuit to charge the cell when the primary charging circuit is enabled; and
   a deeply discharged charging circuit that includes a first deeply discharged charging circuit input that is coupled to the first pass circuit output of the pass circuit, a first deeply discharged charging circuit output that is coupled to the first node, a second deeply discharged charging circuit output that is coupled to the cell, wherein the first deeply discharged charging circuit output is configured to regulate the pass circuit to charge the cell when the primary charging circuit is disabled.

2. The apparatus of claim 1, wherein the pass circuit is a transistor circuit.

3. The apparatus of claim 2, wherein the primary charging circuit is disabled in response to a voltage of the cell being below a predetermined threshold, and otherwise enabled.

4. The apparatus of claim 3, wherein the predetermined threshold is approximately 2V.

5. The apparatus of claim 3, further comprising a POR circuit that includes a POR circuit output coupled to the primary charging circuit and the deeply discharged circuit, wherein the POR circuit is configured to produce a DISABLE signal at the POR circuit output that relates to the cell being in a deeply discharged state and a cell being in a non-deeply discharged state.

6. The apparatus of claim 5, wherein the primary charging circuit further comprises a regulation circuit that includes a regulation circuit input that is coupled to the first pass circuit output of the pass circuit, a second regulation circuit input that is coupled to the POR circuit, and en a regulation circuit output that is coupled to the first node, wherein the regulation circuit is arranged to regulate the pass circuit when the DISABLE signal relates to the non-deeply discharged state.

7. The apparatus as in claim 6, wherein the deeply discharged charging circuit further comprises:

a transistor circuit configured to produce a control signal, wherein the control signal is used to control the pass circuit when the primary charging circuit is disabled; and a current mirror, wherein the current mirror is coupled to the transistor circuit and is configured to enable and disable the transistor circuit in response to a charge level of the cell.

8. The apparatus as in claim 6, wherein the deeply discharged charging circuit further comprises:

a transistor circuit configured to produce a control signal, wherein the control signal is used to control the pass circuit when the primary charging circuit is disabled;

a current reference circuit, wherein the current reference circuit is configured to produce a reference signal when the cell is in the deeply discharged state, wherein the reference signal tends to pull down the gate of the transistor circuit;

a bias circuit, wherein the bias circuit is configured to produce a bias current when the cell is in the deeply discharged state, wherein the bias current tends to pull up the gate of the transistor circuit when the transistor circuit is enabled.

9. The apparatus of claim 8, wherein the deeply discharged charging circuit, further comprises a feedback circuit that includes a feedback circuit input coupled to the first pass circuit output, a first feedback circuit output that is coupled to a second node, and a second feedback circuit output that is coupled to the cell, wherein the feedback circuit is arranged to provide a feedback signal at the second node that relates to a charge level of the cell and the charging signal.

10. The apparatus as in claim 9, wherein the deeply discharged charging circuit further comprises a switch circuit, wherein the switch circuit is configured to provide a current path when the cell is in the deeply discharged state.

11. The apparatus as in claim 10, further comprising: a low-voltage charging path, wherein the low-voltage charging path is used to charge the cell when the cell is below a predetermined threshold voltage.

12. The apparatus of claim 11, wherein the predetermined threshold voltage is 0.5V.

13. The apparatus of claim 11, further comprising a reverse blocking circuit, wherein the reverse blocking circuit is configured to block reverse current when enabled and couple the charging signal when disabled.

14. The apparatus of claim 13, wherein the reverse blocking circuit comprises a PMOS transistor, wherein the source of the PMOS transistor is coupled to the body of the PMOS transistor, and the drain of the PMOS transistor is coupled to the gate of the PMOS transistor.

15. The apparatus as in claim 14, wherein the feedback circuit comprises a PMOS transistor.

16. The apparatus as in claim 15, wherein the current reference circuit further comprises a current mirror coupled to a resistor, wherein the current mirror is configured to produce the reference signal.

17. The apparatus as in claim 16, wherein the bias circuit further comprises a current source coupled to a resistor, wherein the current source is configured to produce the bias current.

18. The apparatus as in claim 17, further comprising a sense resistor, wherein the sense resistor is configured to produce a detection signal, wherein the detection signal corresponds to the charging signal, and the bias circuit is configured to produce the bias current in response to the detection signal when the cell is in the deeply discharged state.

19. A method of charging a cell that may be deeply discharged, comprising:

determining when the cell is in a deeply discharged state and when the cell is in a non-deeply discharged state;

activating a primary charging circuit on a battery charging IC when the cell is in the non-deeply discharged state; and activating a deeply discharged charging circuit on the battery charging IC when the cell is in the deeply-discharged state.

20. The method of claim 19, wherein determining when the cell is in the deeply discharged state and when the cell is in the non-deeply discharged state comprises determining a voltage of the cell and comparing the voltage of the cell to a predetermined threshold.

21. The method of claim 20, wherein the predetermined threshold is two volts.

22. An apparatus for charging a cell that may be deeply discharged comprising;

a means for determining a state of the cell, wherein the state of the cell relates to when the cell is in a deeply discharged state and when the cell is in a non-deeply discharged state;

a means for generating a DISABLE signal that relates to the state of the cell;

a means for enabling and disabling a primary charging circuit integrated onto a battery charging IC in response to the state of the cell; and a means for enabling and disabling a deeply discharged charging circuit integrated onto a battery charging IC in response to the state of the cell.

* * * * *

UNITED STATES PATENT AND TRADEMARK OFFICE
CERTIFICATE OF CORRECTION

PATENT NO.    : 6,686,723 B1
DATED         : February 3, 2004
INVENTOR(S)   : Gregory J. Smith et al.

It is certified that error appears in the above-identified patent and that said Letters Patent is hereby corrected as shown below:

<u>Title page,</u>
Item [75], Inventors, please add -- William D. MacLean, Oro Valley, AZ (US) --.

<u>Column 3,</u>
Line 7, please change "an outpt coupled" to -- an output coupled --.

<u>Column 8,</u>
Line 39, please change "in response an input" to -- in response to an input --.

<u>Column 9,</u>
Line 9, pleae change "and en a regulation" to -- and a regulation --.

Signed and Sealed this

Twenty-second Day of June, 2004

JON W. DUDAS
*Acting Director of the United States Patent and Trademark Office*